(12) United States Patent
Sherrill et al.

(10) Patent No.: US 10,822,075 B2
(45) Date of Patent: Nov. 3, 2020

(54) ROTOR SPAN-BALANCE POCKET

(71) Applicant: Bell Helicopter Textron Inc., Fort Worth, TX (US)

(72) Inventors: Paul Sherrill, Grapevine, TX (US); Tim Ledbetter, Fort Worth, TX (US); Kelli Yates, Cary, IN (US); Robert Self, Fort Worth, TX (US); Nathan Green, Fort Worth, TX (US); Russell Cole, Euless, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 617 days.

(21) Appl. No.: 15/664,809

(22) Filed: Jul. 31, 2017

(65) Prior Publication Data

US 2019/0031327 A1   Jan. 31, 2019

(51) Int. Cl.
*B64C 27/04* (2006.01)
*B64C 27/00* (2006.01)
*B64C 27/46* (2006.01)
*B64C 27/473* (2006.01)
*B64C 27/82* (2006.01)

(52) U.S. Cl.
CPC .......... *B64C 27/008* (2013.01); *B64C 27/463* (2013.01); *B64C 27/473* (2013.01); *B64C 27/04* (2013.01); *B64C 27/82* (2013.01)

(58) Field of Classification Search
None
See application file for complete search history.

(56) References Cited

U.S. PATENT DOCUMENTS

| | | | |
|---|---|---|---|
| 6,139,271 A | 10/2000 | Chadwick | |
| 6,196,066 B1 | 3/2001 | Barbier | |
| 2018/0135728 A1* | 5/2018 | Paulson | B64C 11/008 |
| 2018/0362153 A1* | 12/2018 | Paulson | B64C 11/008 |
| 2019/0031327 A1* | 1/2019 | Sherrill | B64C 27/473 |

FOREIGN PATENT DOCUMENTS

| | | |
|---|---|---|
| DE | 4036708 A1 | 5/1992 |
| EP | 2711293 A2 | 3/2014 |
| GB | 2454590 A | 5/2000 |
| RU | 2148532 C1 | 5/2000 |

OTHER PUBLICATIONS

European Patent Office, European Search Report for EP Appl. No. 17190934.4 dated Mar. 20, 2018, 5 pp.
European Patent Office, Communication pursuant to Article 94(3) EPC for EP Appl. No. 17190934.4 dated Apr. 6, 2018, 6 pp.
European Patent Office, Communication pursuant to Article 94(3) EPC for EP Appl. No. 17190934.4 dated Oct. 17, 2018, 4 pp.

* cited by examiner

*Primary Examiner* — Michael Lebentritt
(74) *Attorney, Agent, or Firm* — Daniel J. Chalker; Edwin S. Flores; Chalker Flores, LLP

(57) ABSTRACT

The present invention includes a span-balance pocket in a surface of a rotor blade, the span-balance pocket including an inboard surface and an outboard surface; and one or more weights disposed in the span-balance pocket to span-balance the rotor blade; and at least one of one or more retention devices to retain the one or more weights against the outboard surface of the span-balance pocket or the span-balance pocket is machined or molded into a tip block of the rotor blade.

31 Claims, 4 Drawing Sheets

ROTOR SPAN-BALANCE POCKET

CROSS-REFERENCE TO RELATED APPLICATIONS

Not applicable.

STATEMENT OF FEDERALLY FUNDED RESEARCH

Not applicable.

TECHNICAL FIELD OF THE INVENTION

The present invention relates in general to the field of span-balancing rotors in aircraft systems, and more particularly, to a novel system for span-balancing a rotor in which centrifugal force is not reacted through fasteners or bondlines.

BACKGROUND OF THE INVENTION

Without limiting the scope of the invention, its background is described in connection with span-balancing rotors in rotorcrafts.

One example of an aircraft is a rotorcraft. A rotorcraft may include one or more rotor systems that must be span-balanced. Such rotors must include ways in which span-balancing weights may be added, removed from, and distributed within rotor blades to substantially span-balance the rotor system and to react the centrifugal force of the weights such that fatigue of components, bondlines, and fasteners is reduced or eliminated.

Existing methods and devices for span-balancing rotor systems include using threaded weights that are inserted into a pocket through the upper surface of a blade and using threaded weights that are screwed and bonded into the tip block of a rotor blade. These existing methods and devices can make installation and removal of the weights more difficult and therefore more time-consuming and costly. An improved system and method for span-balancing rotor systems is desirable.

SUMMARY OF THE INVENTION

In some embodiments of the disclosure, a system is disclosed as including: a span-balance pocket in a surface of a rotor blade, the span-balance pocket including an inboard surface and an outboard surface; one or more weights disposed against the outboard surface in the span-balance pocket to react the centrifugal force of the one or more weights through the outboard surface; and one or more retention devices to retain the one or more weights against the outboard surface of the span-balance pocket. In one aspect, the rotor blade is a tail rotor blade, main rotor blade, proprotor blade, a propeller blade, or a wind-turbine blade. In another aspect, the span-balance pocket is machined or molded into the surface of the rotor blade. In another aspect, the span-balance pocket is machined or molded into the surface of a tip block of the rotor blade. In another aspect, the system further includes a cover covering the span-balance pocket, wherein the cover is substantially flush with the surface of the rotor blade and is attached to the rotor blade. In another aspect, a cover recess to accommodate the cover is machined or molded into the surface of the rotor blade. In another aspect, the one or more retention devices include one or more bolts. In another aspect, the one or more bolts are positioned between the one or more weights and the inboard surface of the span-balance pocket.

In some embodiments of the disclosure, a system is disclosed as including: a span-balance pocket in a surface of a rotor blade, the span-balance pocket including an inboard surface and an outboard surface; and one or more weights disposed against the outboard surface in the span-balance pocket to react the centrifugal force of the one or more weights through the outboard surface; wherein the span-balance pocket is machined or molded into a tip block of the rotor blade. In one aspect, the rotor blade is a tail rotor blade, main rotor blade, proprotor blade, a propeller blade, or a wind-turbine blade. In another aspect, the system further includes a cover covering the span-balance pocket, wherein the cover is substantially flush with the surface of the rotor blade and is attached to the rotor blade. In another aspect, a cover recess to accommodate the cover is machined or molded into the surface of the rotor blade. In another aspect, the system further includes one or more retention devices to retain the one or more weights against the outboard surface of the span-balance pocket. In another aspect, the one or more retention devices include one or more bolts. In another aspect, the one or more retention devices are positioned between the one or more weights and the inboard surface of the span-balance pocket.

In other embodiments of the disclosure, a method is disclosed as including: providing a span-balance pocket in a surface of a rotor blade, the span-balance pocket including an inboard surface and an outboard surface; disposing one or more weights against the outboard surface to react the centrifugal force of the one or more weights through the outboard surface; and retaining the one or more weights against the outboard surface of the span-balance pocket. In one aspect, the rotor blade is a tail rotor blade, main rotor blade, proprotor blade, a propeller blade, or a wind-turbine blade. In another aspect, the method further includes providing the span-balance pocket in the surface of the rotor blade by machining or molding the span-balance pocket into the surface of the rotor blade. In another aspect, the method further includes machining or molding the span-balance pocket into a surface of a tip block of the rotor blade. In another aspect, the method further includes providing a cover covering the span-balance pocket, wherein the cover is substantially flush with the surface of the rotor blade and is attached to the rotor blade. In another aspect, the method further includes machining or molding a cover recess into a surface of a rotor blade to accommodate the cover. In another aspect, the method further includes retaining the one or more weights against the outboard surface of the span-balance pocket with one or more retention devices. In another aspect, the one or more retention devices include one or more bolts. In another aspect, the method further includes positioning the one or more retention devices between the one or more weights and the inboard surface of the span-balance pocket.

In other embodiments of the disclosure, a method is disclosed as including: machining or molding a span-balance pocket into a tip block of a rotor blade, the span-balance pocket including an inboard surface and an outboard surface; and disposing one or more weights against the outboard surface to react the centrifugal force of the one or more weights through the outboard surface. In one aspect, the rotor blade is a tail rotor blade, main rotor blade, proprotor blade, a propeller blade, or a wind-turbine blade. In another aspect, the method further includes providing a cover covering the span-balance pocket, wherein the cover is substantially flush with a surface of the tip block of the rotor blade and is attached to the rotor blade. In another aspect, the method further includes machining or molding a cover recess into the surface of the tip block of the rotor blade to accommodate the cover. In another aspect, the method further includes retaining the one or more weights against the outboard surface of the span-balance pocket. In another aspect, the method further includes retaining the one or more weights against the outboard surface of the span-balance pocket with one or more retention devices. In another aspect, the one or more retention devices include one or more bolts. In another aspect, the method further includes positioning the one or more retention devices between the one or more weights and the inboard surface of the span-balance pocket.

In other embodiments of the disclosure, a rotorcraft is disclosed as including: a fuselage; one or more engines coupled to the fuselage; and at least one rotor system coupled to the one or more engines, the at least one rotor system including a plurality of rotor blades, at least one rotor blade including: a span-balance pocket in a surface of the at least one rotor blade, the span-balance pocket including an inboard surface and an outboard surface; one or more weights disposed against the outboard surface in the span-balance pocket to react the centrifugal force of the one or more weights through the outboard surface; and one or more retention devices to retain the one or more weights against the outboard surface of the span-balance pocket.

In other embodiments of the disclosure, a rotorcraft is disclosed as including: a fuselage; one or more engines coupled to the fuselage; and at least one rotor system coupled to the one or more engines, the at least one rotor system including a plurality of rotor blades, at least one rotor blade including: a span-balance pocket in a surface of the at least one rotor blade; and one or more weights disposed against the outboard surface in the span-balance pocket to react the centrifugal force of the one or more weights through the outboard surface; wherein the span-balance pocket is machined or molded into a tip block of the at least one rotor blade.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
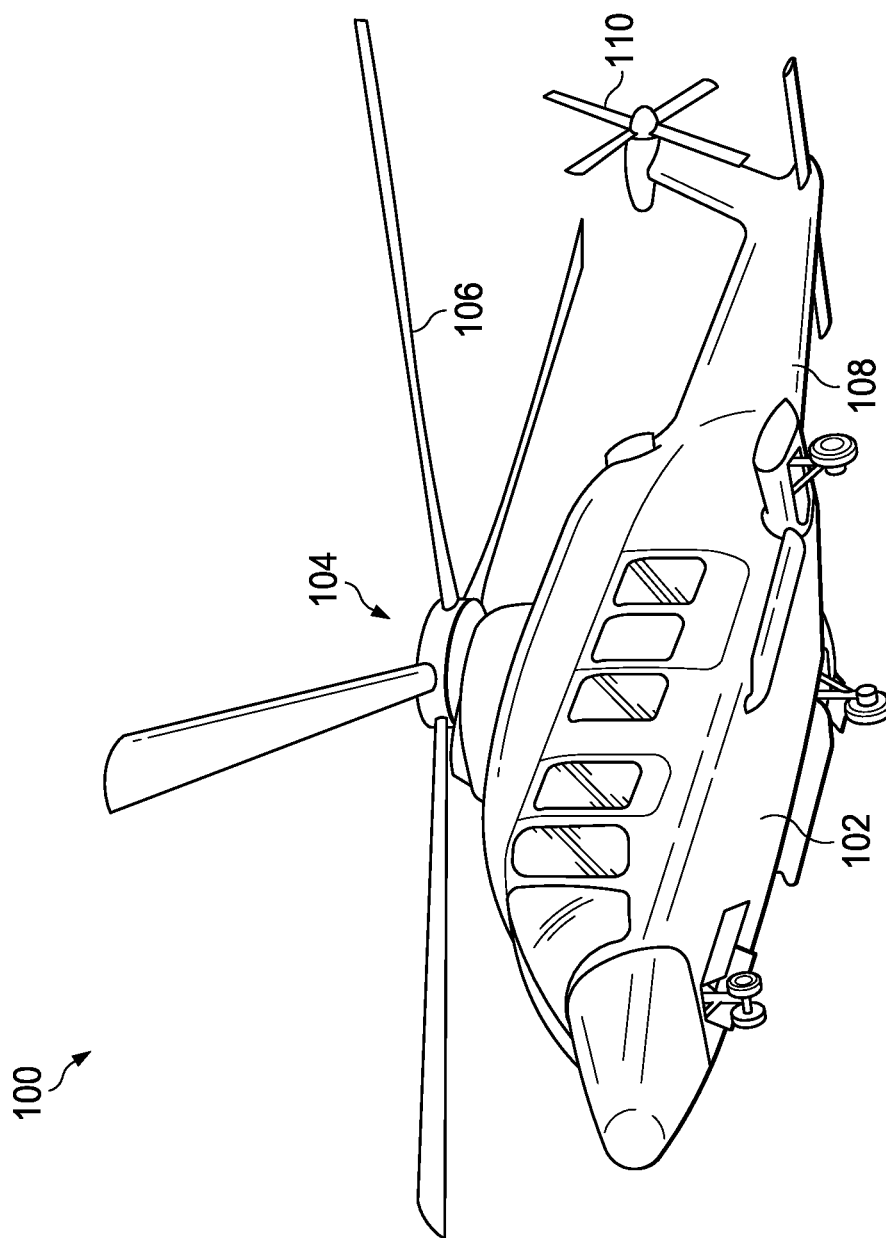
FIG. 1 shows a perspective view of a helicopter according to a particular embodiment of the present application.

FIG. 1 shows an aircraft 100 in accordance with a particular embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
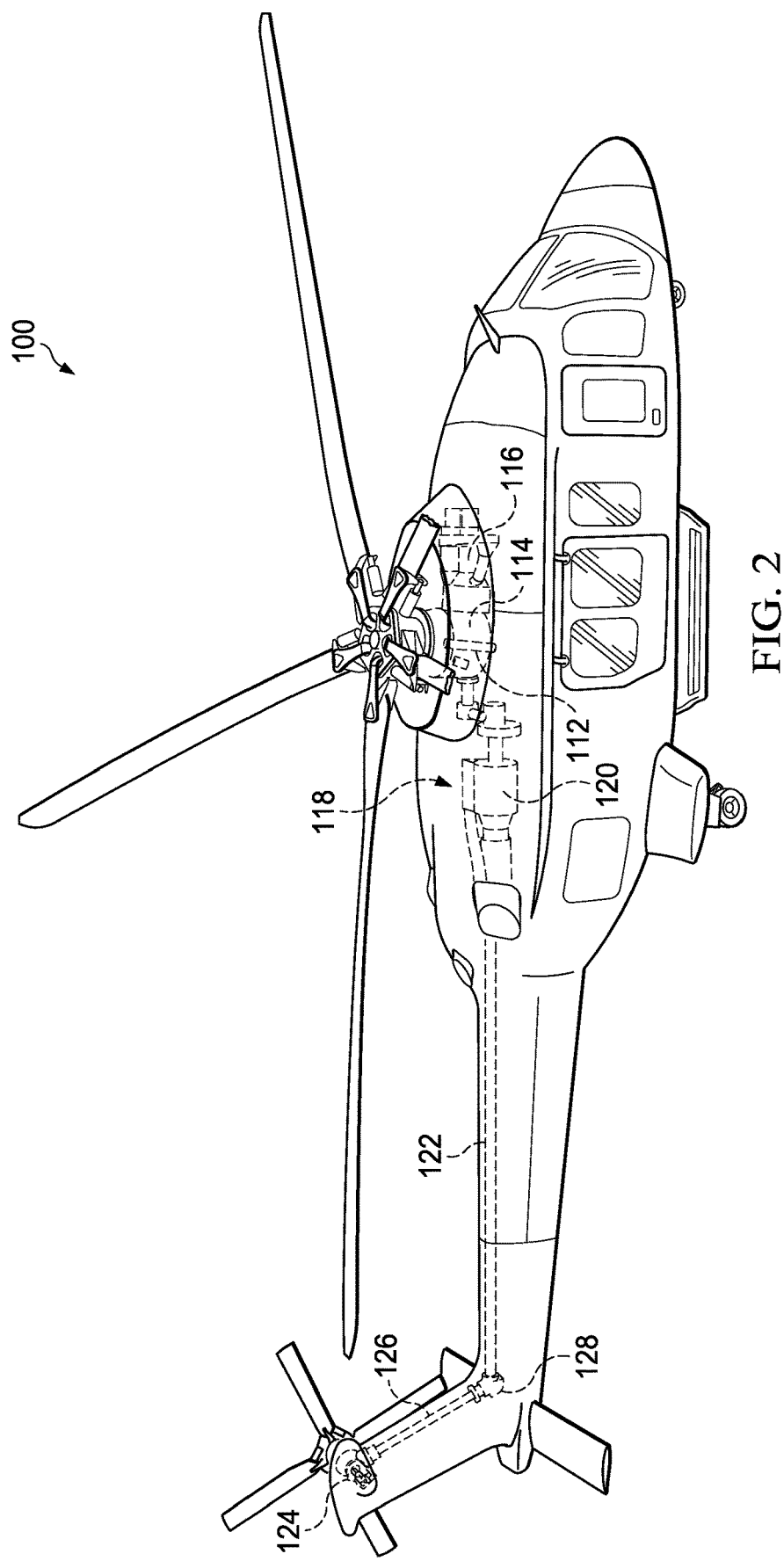
FIG. 2 shows a partial cross-section, perspective view of a helicopter according to an embodiment of the present application.

For example, FIG. 2 shows a partial cross-section, perspective view of aircraft 100 that includes additional detail of an embodiment of the present invention. Aircraft 100 further includes a rotor mast 112, which is connected to the main rotor gearbox 114. The main rotor gearbox 114 is connected to one or more accessory gear boxes 116. The engine compartment 118 contains one or more engines 120 and the main rotor gearbox 114 is connected to the one or more engines 120. A tail rotor drive shaft 122 transmits mechanical rotation from the main rotor gearbox 114 to the tail rotor gear box 124, which is connected via tail rotor drive shaft 126, via intermediate gear box 128.

Figure 3:
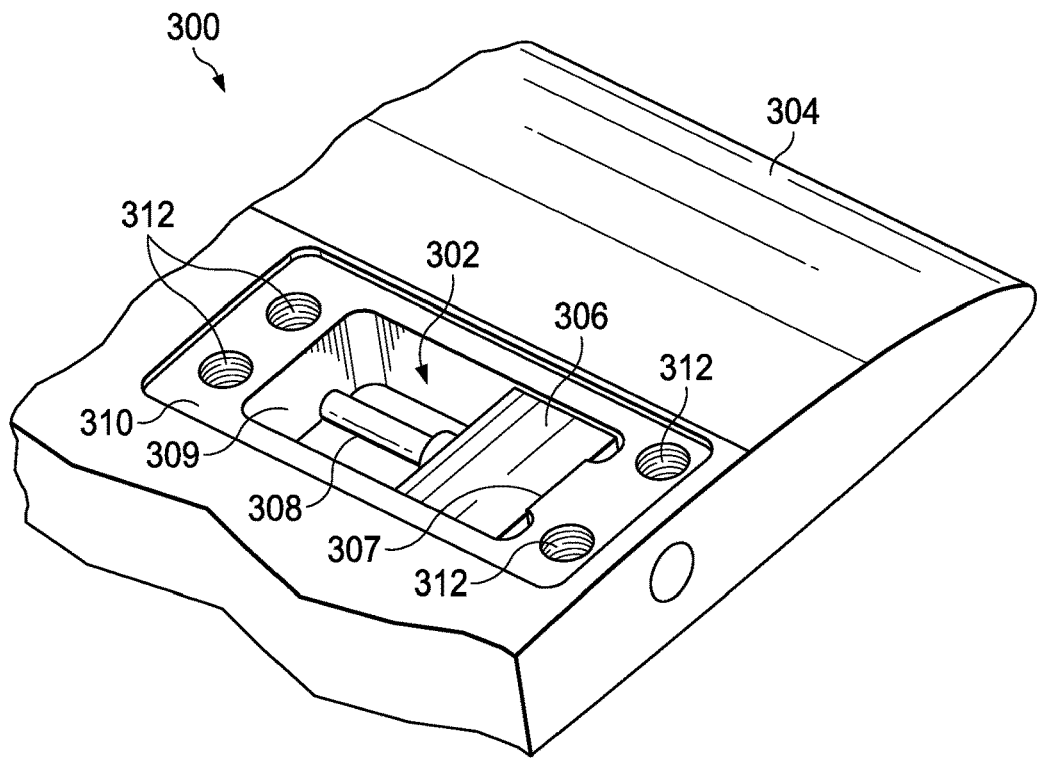
FIG. 3 shows a perspective view of an embodiment of the present invention.

FIG. 3 shows a perspective view of an embodiment of a rotor span-balancing system 300. Rotor span-balancing system 300 includes a span-balance pocket 302, which is machined or molded into a solid portion of rotor blade 304 of tail rotor 110, such as a solid tip block. Span-balance pocket 302 contains one or more span-balance weights 306 that are selected to meet the span-balance requirements of tail rotor 110. Here four exemplary span-balance weights 306 are shown. The span-balance weights may be retained against the outboard wall 307 of span-balance pocket 302 with one or more retention devices, such as span-balance bolts 308. Here, one exemplary span-balance bolt 308 is shown positioned between the span-balance weights 306 and the inboard surface 309 of the span-balance pocket 302. With this rotor span-balancing system 300, the centrifugal force of the span-balance weights 306 and the span-balance bolts 308 is reacted to the outboard wall 307 of span-balance pocket 302 (not shown). There are no shear loads on the span balance bolts 308. Cover recess 310, cover retention holes 312, and any holes required for weight retention within span-balance pocket 302 are also machined into rotor blade 304. Rotor span-balancing system 300 is shown in conjunction with rotor blade 304 of tail rotor 110, but it may also be used in conjunction with rotor blades of main rotors, pro-protors, wind-turbine rotors, and other types of rotors, and with propeller blades in propeller systems.

Figure 4:
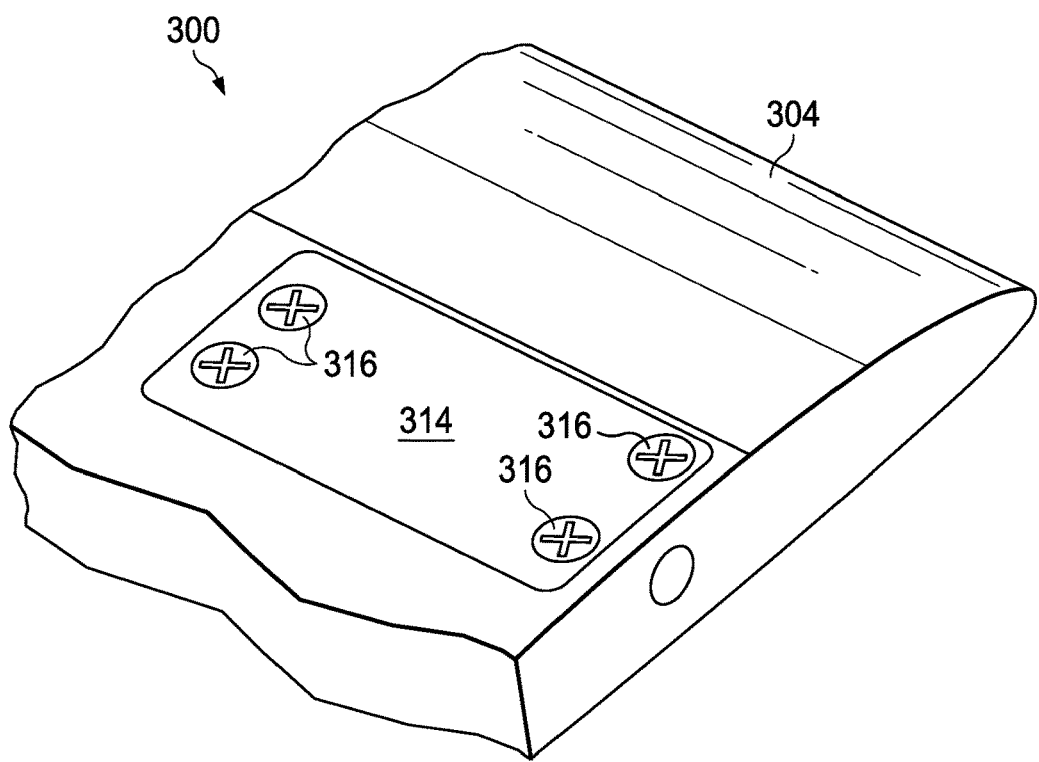
FIG. 4 shows a perspective view of an embodiment of the present invention.

FIG. 4 shows a perspective view of an embodiment of the present invention. In this embodiment, span-balance cover 314 is retained in place in cover recess 310 and retained by cover fasteners, such as the exemplary screws 316 shown here, inserted into cover retention holes 312 (see FIG. 3). So retained, span-balance cover 314 and screws 316 are substantially flush with the surface of rotor blade 304.

Figure 5A:
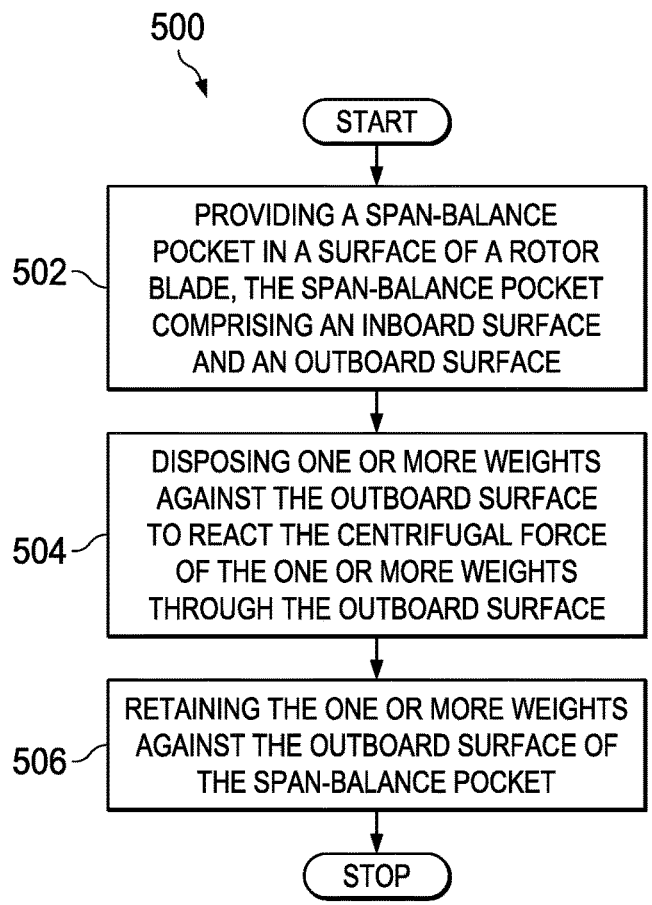
FIG. 5A is a flowchart of a method embodiment of the present invention.
Figure 5B:
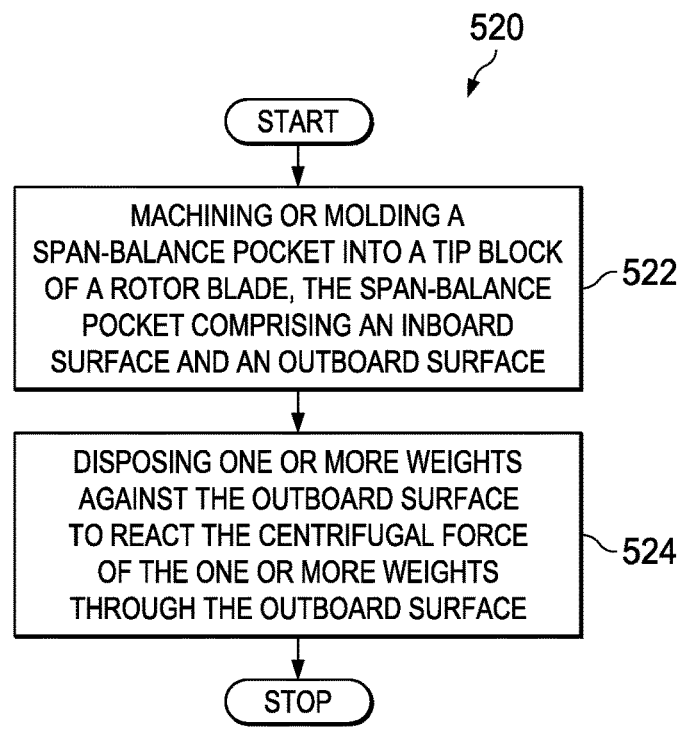
FIG. 5B is a flowchart of a method embodiment of the present invention.

FIGS. 5A and 5B show flowcharts of method embodiments of the present invention. FIG. 5A illustrates a method of rotor-blade span balancing 500, which includes block 502, providing a span-balance pocket in a surface of a rotor blade, the span-balance pocket including an inboard surface and an outboard surface. Method 500 also includes block 504, disposing one or more weights against the outboard surface to react the centrifugal force of the one or more weights through the outboard surface. Method 500 further includes block 506, retaining the one or more weights against the outboard surface of the span-balance pocket.

FIG. 5B depicts another method, a method of rotor-blade span balancing 520. Method 520 includes block 522, machining or molding a span-balance pocket into a tip block of a rotor blade, the span-balance pocket including an inboard surface and an outboard surface, and block 524, disposing one or more weights against the outboard surface to react the centrifugal force of the one or more weights through the outboard surface.

The skilled artisan will recognize that the novel rotor-blade span-balancing system 300 and method 500 of the present invention provide for reaction of centrifugal forces of span-balance weights 306 and span-balance bolt 308 through a machined or molded feature of rotor blade 304 such as the outboard wall of span-balance pocket 302, and not through fasteners or bondlines, reducing fatigue and degradation of materials or components, lowering operation and maintenance costs and increasing aircraft safety.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A rotor-blade span-balancing system, comprising:
   a span-balance pocket in a surface of a rotor blade, the span-balance pocket comprising an inboard surface and an outboard surface;
   one or more weights disposed against the outboard surface in the span-balance pocket to react the centrifugal force of the one or more weights through the outboard surface; and
   one or more retention devices positioned between the one or more weights and the inboard surface of the span-balance pocket to retain the one or more weights against the outboard surface of the span-balance pocket such that there are no shear loads on the one or more retention devices.

2. The system of claim 1, wherein the rotor blade is a tail rotor blade, main rotor blade, proprotor blade, a propeller blade, or a wind-turbine blade.

3. The system of claim 1, wherein the span-balance pocket is machined or molded into the surface of the rotor blade.

4. The system of claim 3, wherein the span-balance pocket is machined or molded into the surface of a tip block of the rotor blade.

5. The system of claim 1, further comprising a cover covering the span-balance pocket, wherein the cover is substantially flush with the surface of the rotor blade and is attached to the rotor blade.

6. The system of claim 5, wherein a cover recess to accommodate the cover is machined or molded into the surface of the rotor blade.

7. The system of claim 1, wherein the one or more retention devices comprise one or more bolts.

8. A rotor-blade span-balancing system, comprising:
   a span-balance pocket in a surface of a rotor blade, the span-balance pocket comprising an inboard surface and an outboard surface;
   one or more weights disposed against the outboard surface in the span-balance pocket to react the centrifugal force of the one or more weights through the outboard surface; and
   wherein the span-balance pocket is machined or molded into a tip block of the rotor blade.

9. The system of claim 8, wherein the rotor blade is a tail rotor blade, main rotor blade, proprotor blade, a propeller blade, or a wind-turbine blade.

10. The system of claim 8, further comprising a cover covering the span-balance pocket, wherein the cover is substantially flush with the surface of the rotor blade and is attached to the rotor blade.

11. The system of claim 10, wherein a cover recess to accommodate the cover is machined or molded into the surface of the rotor blade.

12. The system of claim 8, further comprising one or more retention devices to retain the one or more weights against the outboard surface of the span-balance pocket.

13. The system of claim 12, wherein the one or more retention devices comprise one or more bolts.

14. The system of claim 12, wherein the one or more retention devices are positioned between the one or more weights and the inboard surface of the span-balance pocket.

15. A method of rotor-blade span balancing, comprising:
   providing a span-balance pocket in a surface of a rotor blade, the span-balance pocket comprising an inboard surface and an outboard surface;
   disposing one or more weights against the outboard surface to react the centrifugal force of the one or more weights through the outboard surface; and
   retaining the one or more weights against the outboard surface of the span-balance pocket with one or more retention devices positioned between the one or more weights and the inboard surface of the span-balance pocket such that there are no shear loads on the one or more retention devices.

16. The method of claim 15, wherein the rotor blade is a tail rotor blade, main rotor blade, proprotor blade, a propeller blade, or a wind-turbine blade.

17. The method of claim 15, further comprising providing the span-balance pocket in the surface of the rotor blade by machining or molding the span-balance pocket into the surface of the rotor blade.

18. The method of claim 17, further comprising machining or molding the span-balance pocket into a surface of a tip block of the rotor blade.

19. The method of claim 15, further comprising providing a cover covering the span-balance pocket, wherein the cover is substantially flush with the surface of the rotor blade and is attached to the rotor blade.

20. The method of claim 19, further comprising machining or molding a cover recess into a surface of a rotor blade to accommodate the cover.

21. The method of claim 15, wherein the one or more retention devices comprise one or more bolts.

22. A method of rotor-blade span balancing, comprising:
   machining or molding a span-balance pocket into a tip block of a rotor blade, the span-balance pocket comprising an inboard surface and an outboard surface; and
   disposing one or more weights against the outboard surface to react the centrifugal force of the one or more weights through the outboard surface.

23. The method of claim 22, wherein the rotor blade is a tail rotor blade, main rotor blade, proprotor blade, a propeller blade, or a wind-turbine blade.

24. The method of claim 22, further comprising providing a cover covering the span-balance pocket, wherein the cover is substantially flush with a surface of the tip block of the rotor blade and is attached to the rotor blade.

25. The method of claim 24, further comprising machining or molding a cover recess into the surface of the tip block of the rotor blade to accommodate the cover.

26. The method of claim 22, further comprising retaining the one or more weights against the outboard surface of the span-balance pocket.

27. The method of claim 26, further comprising retaining the one or more weights against the outboard surface of the span-balance pocket with one or more retention devices.

28. The method of claim 27, wherein the one or more retention devices comprise one or more bolts.

29. The method of claim 27, further comprising positioning the one or more retention devices between the one or more weights and the inboard surface of the span-balance pocket.

30. A rotorcraft, comprising:
a fuselage;
one or more engines coupled to the fuselage; and
at least one rotor system coupled to the one or more engines, the at least one rotor system comprising a plurality of rotor blades, at least one rotor blade comprising:
a span-balance pocket in a surface of the at least one rotor blade, the span-balance pocket comprising an inboard surface and an outboard surface;
one or more weights disposed against the outboard surface in the span-balance pocket to react the centrifugal force of the one or more weights through the outboard surface; and
one or more retention devices positioned between the one or more weights and the inboard surface of the span-balance pocket to retain the one or more weights against the outboard surface of the span-balance pocket such that there are no shear loads on the one or more retention devices.

31. A rotorcraft, comprising:
a fuselage;
one or more engines coupled to the fuselage; and
at least one rotor system coupled to the one or more engines, the at least one rotor system comprising a plurality of rotor blades, at least one rotor blade comprising:
a span-balance pocket in a surface of the at least one rotor blade; and
one or more weights disposed against the outboard surface in the span-balance pocket to react the centrifugal force of the one or more weights through the outboard surface;
wherein the span-balance pocket is machined or molded into a tip block of the at least one rotor blade.

* * * * *